United States Patent
Fujisawa et al.

(10) Patent No.: US 7,849,288 B2
(45) Date of Patent: Dec. 7, 2010

(54) ALTERNATELY SELECTING MEMORY UNITS TO STORE AND RETRIEVE CONFIGURATION INFORMATION IN RESPECTIVE AREAS FOR A PLURALITY OF PROCESSING ELEMENTS TO PERFORM PIPELINED PROCESSES

(75) Inventors: Hisanori Fujisawa, Kawasaki (JP); Miyoshi Saito, Kawasaki (JP); Toshihiro Ozawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/546,284

(22) Filed: Oct. 12, 2006

(65) Prior Publication Data

US 2007/0083733 A1    Apr. 12, 2007

Related U.S. Application Data

(63) Continuation of application No. PCT/JP2004/010953, filed on Jul. 30, 2004.

(51) Int. Cl.
*G06F 15/80* (2006.01)
(52) U.S. Cl. .......................................... 712/15; 712/16
(58) Field of Classification Search .................. None
See application file for complete search history.

(56) References Cited

U.S. PATENT DOCUMENTS

| | | | |
|---|---|---|---|
| 5,572,691 A * | 11/1996 | Koudmani | 711/5 |
| 6,034,538 A | 3/2000 | Abramovici | |
| 6,883,084 B1 * | 4/2005 | Donohoe | 712/1 |
| 7,194,610 B2 * | 3/2007 | Uriu et al. | 712/241 |
| 2005/0027836 A1 | 2/2005 | Nishihara | |
| 2006/0004992 A1 * | 1/2006 | Fujisawa et al. | 712/226 |
| 2007/0033369 A1 * | 2/2007 | Kasama et al. | 711/170 |

FOREIGN PATENT DOCUMENTS

| | | |
|---|---|---|
| GB | 2 333 625 A | 7/1999 |
| JP | 05-108347 | 4/1993 |
| JP | 08-330945 | 12/1996 |
| JP | 2000-040745 | 2/2000 |
| JP | 2001-068993 | 3/2001 |
| JP | 2003-029969 | 1/2003 |
| WO | 02/093404 A2 | 11/2002 |

OTHER PUBLICATIONS

Herman Schmit, "*Incremental Reconfiguration for Pipelined of Applications*", Proceedings of the IEEE Symposium on FPGAs Custom Computing Machines (FCCM), 1997, pp. 47-55, Pittsburgh, PA.

* cited by examiner

*Primary Examiner*—Kenneth S Kim
(74) *Attorney, Agent, or Firm*—Fujitsu Patent Center

(57) ABSTRACT

A reconfigurable circuit and control method therefor, capable of enhancing efficiency of implementation of a pipeline process in processing elements and improve processing performance. Processing elements are reconfigured to form a circuit based on configuration information and execute a prescribed process. Memory units store configuration information for the processing elements. A memory switching unit switches the plurality of memory units to store therein the configuration information on the stages of a pipeline process to be performed by the processing elements. A configuration information output unit switches the memory units to output therefrom the configuration information to the plurality of processing elements.

9 Claims, 15 Drawing Sheets

K=Lower(Nop/Npe)

FOR I=1,⋯,THE NUMBER OF PIPELINE STAGES
    IF (THE NUMBER OF OPERATIONS OF I-th PIPELINE
    STAGE<THE NUMBER OF UNASSIGNED PEs OF Si)
    ASSIGN OPs OF I-th PIPELINE STAGE TO UNASSIGNED PEs OF sI SIDE
    WHICH ARE CAPABLE OF RECEIVING OUTPUT SIGNALS FROM PSs OF
    PRECEDING STAGE
        IF (UNIMPLEMENTABLE)
        IF (K<M)
            REPEAT FROM THE BEGINNING BY INCREMENTING K TO K+1
        ELSE
            END
    ELSE
        IF (K<M)
            REPEAT FROM THE BEGINNING BY INCREMENTING K1 TO K+1
        ELSE
            END
    I++
DONE

FIG. 7

ALTERNATELY SELECTING MEMORY UNITS TO STORE AND RETRIEVE CONFIGURATION INFORMATION IN RESPECTIVE AREAS FOR A PLURALITY OF PROCESSING ELEMENTS TO PERFORM PIPELINED PROCESSES

This application is a continuing application, filed under 35 U.S.C. §111(a), of International Application PCT/JP2004/010953, filed Jul. 30, 2004.

BACKGROUND OF THE INVENTION

1. Field of the Invention

This invention relates to a reconfigurable circuit and a control method therefor. More particularly, this invention relates to a reconfigurable circuit having a plurality of processing elements that are reconfigured based on configuration information, and a control method for such a reconfigurable circuit.

2. Description of the Related Art

Conventionally, there is a reconfigurable circuit having a group of configurable operating units. The reconfigurable circuit forms a group of operating units based on configuration data so as to perform various kinds of processes. For a case where a single pipeline process cannot be implemented in such a reconfigurable circuit, there is proposed a method of implementing such a pipeline process by partitioning the reconfigurable circuit to correspond to pipeline stages and sequentially executing the operations of the stages (for example, see H. Schmit, "Incremental Reconfiguration for Pipelined Applications", Proceedings of the IEEE Symposium on FPGAs for Custom Computing Machines (FCCM), P. 47 to 55, 1997).

FIG. 10 is a circuit block diagram of a conventional reconfigurable circuit.

As shown in this figure, the reconfigurable circuit has processing elements (PE: Processing Element) 101a to 101d and a network 102.

Each processing element 101a to 101d has a plurality of ALUs (Arithmetic Logical Unit), multipliers, and adders. The ALUs, Multipliers, and adders of the processing elements 101a to 101d are configured based on configuration data so that each executes an operation of a stage of a pipeline process.

The network 102 connects the processing elements 101a to 101d based on the configuration data so that the processing elements 101a to 101d can perform the pipeline process.

The pipeline process is a process of sequentially performing operations on sequentially inputted data. For example, multiply and accumulation represented by a FIR (Finite Impulse Response) filter are a pipeline process of sequentially performing multiply and accumulation operations on sequentially inputted data. An operation indicates a single operation out of operations to be sequentially performed. For example, speaking of the above-described multiply and accumulation, multiply and accumulation operations are sequentially performed on sequentially inputted data, and one of the multiply and accumulation operations is called a single operation. The pipeline process is divided into a plurality of stages and one or more operations are preformed at one stage.

FIG. 11 shows a pipeline process.

The illustrated pipeline process 111 is a single pipeline process comprising the operations OP1 to OP8. Arrows in this figure represent a data flow and it is assumed that data to be processed is sequentially inputted to the operation OP1. If the above-described multiply and accumulation are applied here for explanation, the operations OP1 to OP8 are the multiply and accumulation operations of eight stages to be performed on the data inputted to the operation OP1, where each operation OP1 to OP8 is a single multiply and accumulation operation.

Implementation of the pipeline process 111 in the reconfigurable circuit of FIG. 10 will be now described. As explained above, an operation of one stage of the pipeline process is assigned to each of the processing elements 101a to 101d of the reconfigurable circuit shown in FIG. 10. Since there are four processing elements 101a to 101d for the operations OP1 to OP8 of eight stages, the pipeline process is performed while assignment of the operations OP1 to OP8 to the processing elements 101a to 101d is changed every cycle.

FIG. 12 shows a flow of the pipeline process of FIG. 11 in the reconfigurable circuit of FIG. 10.

Illustrated squares represent the processing elements 101a to 101d of FIG. 10. The insides of the squares show the operations OP1 to OP8 assigned to the processing elements 101a to 101d. Note that data to be processed is sequentially inputted to the operation OP1 first.

In cycle 1, the operation OP1 is assigned to the processing element 101a and data is inputted. In cycle 2, the operation OP2 is assigned to the processing element 101b. At this time, data resulted from the operation OP1 in cycle 1 is inputted to the processing element 101b and next data is inputted to the operation OP1. Then the operations OP3 and OP4 are sequentially assigned to the processing elements 101c and 101d in cycles 3 and 4, respectively, and data resulted from the operations OP2 and OP3 of the preceding stages (previous cycles) is inputted thereto. In addition, data is sequentially inputted to the operation OP1.

In cycle 5, since there is no other processing elements for assignment of the operation OP5, the operation OP5 is assigned to the processing element 101a. At this time, it is designed that data from the processing element 101d (resulted from the operation OP4) is outputted to the processing element 101a (operation OP5).

In cycles 6 to 8, the operations OP6 to OP8 are sequentially assigned to the processing elements 101b to 101d, respectively, and data resulted from the operations OP5 to OP7 of the preceding stages (previous cycles) is inputted thereto. It should be noted that new data is not inputted in cycles 5 to 8. This is because the operations OP1 to OP4 are not assigned to the processing elements 101a to 101d and so the pipeline process cannot be performed. Although unillustrated, in cycle 9, the operation OP1 is assigned to the processing element 101a and next data is inputted.

The above-described method of implementing a pipeline process in the processing elements 101a to 101d by sequentially switching the stages of the pipeline process requires a shorter processing time as compared with a method of implementing implementable pipeline stages in the processing elements 101a to 101d at one time. This is because, according to the method of implementation at one time, when the operations of the implemented pipeline stages are completed, the operation results should be temporarily saved in a memory unit and then subsequent pipeline stages should be implemented in the processing elements 101a to 101d. By contrast, according to the method of implementation by sequentially switching the stages of the pipeline process, operation results may not be temporarily saved into a memory unit, resulting in shortening a processing time.

A case where a plurality of operations should be simultaneously performed at a stage of a pipeline process will be now described. In this case, a plurality of pipeline stages should be simultaneously assigned to processing elements.

FIG. 13 shows a pipeline process in a case of simultaneously assigning a plurality of pipeline stages to processing elements.

In the illustrated pipeline process 112, the operations OP1 and OP2 are executed at the first stage. The operations OP3 and OP4 are executed at the second stage. Then, the operations OP5 to OP7 are sequentially executed at respective stages. Arrows in this figure represent a data flow and it is assumed that data to be processed is sequentially inputted to the operations OP1 and OP2. Implementation of this pipeline process 112 in the reconfigurable circuit of FIG. 10 will be now described.

FIG. 14 shows a flow of the pipeline process of FIG. 13 in the reconfigurable circuit of FIG. 10.

Illustrated squares represent the processing elements 101a to 101d of FIG. 10. The insides of the squares show the operations OP1 to OP7 assigned to the processing elements 101a to 101d. Data to be processed is sequentially inputted to the operations OP1 and OP2 first. None indicates a status where no operation is assigned.

At the first stage of the pipeline 112 shown in FIG. 13, the two operations OP1 and OP2 should be executed. In addition, at the second stage of the pipeline process 112, the two operations OP3 and OP4 should be executed. Therefore, the reconfigurable circuit shown in FIG. 10 should be configured so that a combination of the processing elements 101a and 101b and a combination of the processing elements 101c and 101d each can simultaneously execute the two operations, as shown in FIG. 14.

In cycle 1, the operations OP1 and OP2 are assigned to the processing elements 101a and 101b and data is inputted to them. In cycle 2, the operations OP3 and OP4 are assigned to the processing elements 101c and 101d. At this time, data resulted from the operations OP1 and OP2 in cycle 1 is inputted to the processing elements 101c and 101d. On the other hand, next data is inputted to the operations OP1 and OP2. In cycles 3 to 5, the operations OP5 to OP7 are sequentially assigned to the combination of the processing elements 101a and 101b or the processing elements 101c and 101d, and data from the preceding stages is inputted thereto.

The operations OP5 to OP7 should be executed each at one stage as shown in FIG. 13. Therefore, only one operation is implemented in each of a combination of the processing elements 101a and 101b and a combination of the processing elements 101c and 101d. As described above, this is because each of the combinations of the processing elements 101a and 101b and the processing elements 101c and 101d are configured so as to simultaneously execute two operations. Therefore, out of the processing elements 101a and 101b and the processing elements 101c and 101d, one processing element becomes free (none state), which deteriorates efficiency of implementation.

In cycle 6, following cycle 5, the operation OP7 should be assigned to the processing element 101a, 101b. This is because data inputted in cycle 1 is processed by the operation OP7 in cycle 5, but data inputted in cycle 2 has been processed by the operations up to the operation OP6 by the time of cycle 5 and the data should be processed by the operation OP7 in cycle 6. No data is inputted in cycles 3 to 6 and next data can be inputted in next cycle 7.

FIG. 15 is a timing chart of input/output of data in the pipeline process of FIG. 13.

CLK of this figure indicates timing of executing operations. IN indicates input timing of data to the operations OP1 and OP2. OUT indicates output timing of data from the operation OP7.

As shown in this figure, data is inputted to the operations OP1 and OP2 at CLKs 1 and 2 (CLK corresponds to cycle shown in FIG. 14). Data inputted at CLK 1 is processed in the operation OP7 at CLK 5 as explained with reference to FIG. 14. Then, the data inputted at CLK 1 is outputted at CLK 6 as shown in FIG. 15. Data inputted at CLK 2 is processed in the operation OP7 at CLK 6 as explained with reference to FIG. 14. Then, the data inputted at CLK 2 is outputted at CLK 7 as shown in FIG. 15. The operations OP1 and OP2 are assigned to the processing elements 101a and 101b at CLK 7 again and next data is inputted thereto.

In a case where a plurality of operations are to be executed simultaneously at a stage of a pipeline process, the plurality of operations should be assigned to processing elements at the same time. This case produces a problem in that efficiency of implementation of the pipeline process in the processing elements deteriorates and processing performance degrades.

SUMMARY OF THE INVENTION

In view of the foregoing, it is an object of the present invention to provide a reconfigurable circuit and a control method for such a reconfigurable circuit, which is capable of enhancing efficiency of implementation of a pipeline process in processing elements and improving processing performance.

To accomplish the above object, the present provides a reconfigurable circuit having a plurality of processing elements that are reconfigured based on configuration information. The reconfigurable circuit comprises: a plurality of memory units for storing the configuration information for the plurality of processing elements; a memory switching unit for switching the plurality of memory units to store therein the configuration information on stages of a pipeline process to be performed by the plurality of processing elements; and a configuration information output unit for switching the plurality of memory units to output therefrom the configuration information to the plurality of processing elements.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is a view explaining operation of a configuration loading unit of FIG. 3.

DESCRIPTION OF THE PREFERRED EMBODIMENTS

The principles of this invention will be hereafter described in detail with reference to the accompanying drawings.

Figure 1:
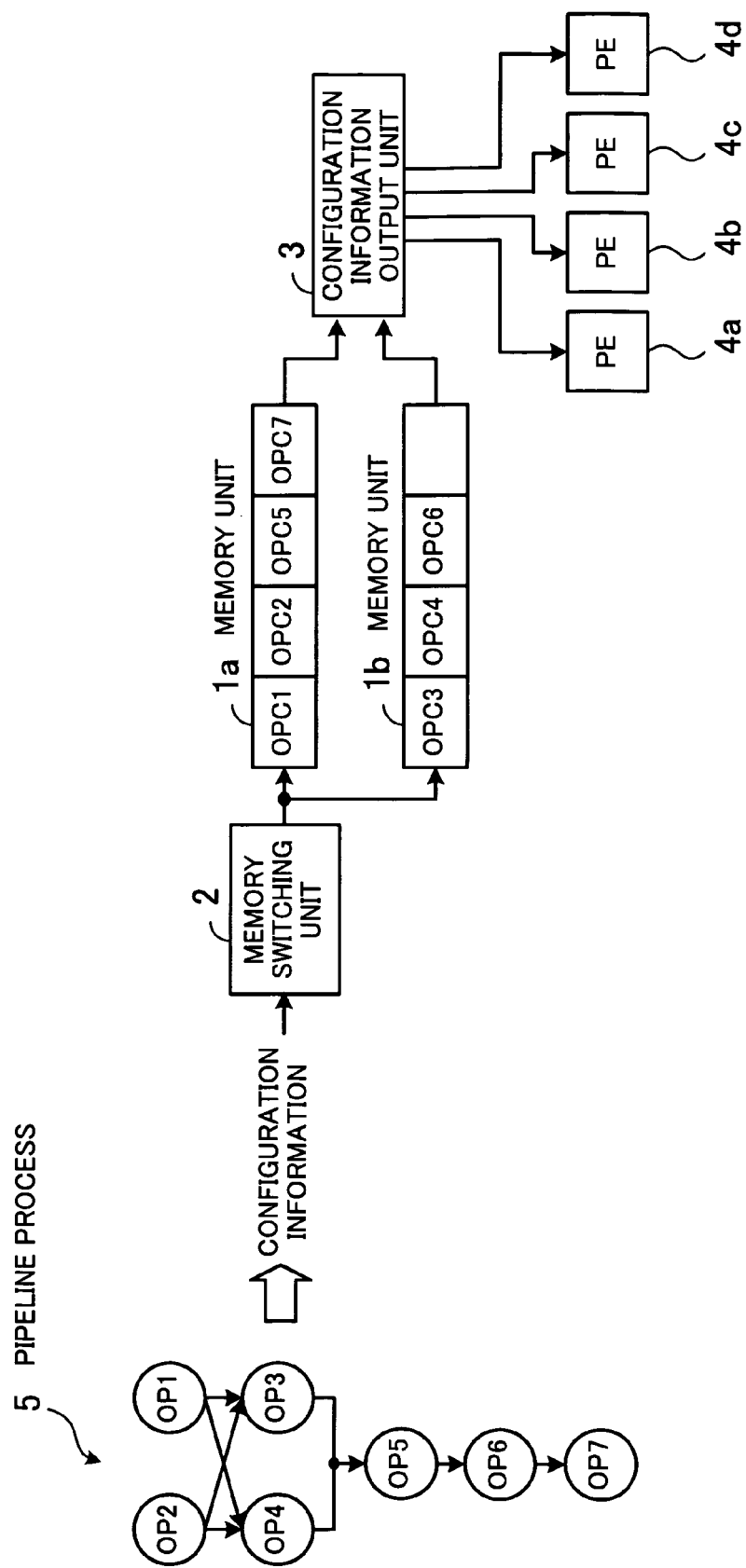
FIG. 1 is a view explaining the outline of a reconfigurable circuit.

FIG. 1 is a view explaining the outline of a reconfigurable circuit.

Referring to this figure, the reconfigurable circuit has memory units 1a and 1b, a memory switching unit 2, a configuration information output unit 3 and processing elements 4a to 4d. In addition, in this figure, a pipeline process 5 to be executed by the reconfigurable circuit is illustrated.

The memory units 1a and 1b store configuration information for the processing elements 4a to 4d. The processing elements 4a to 4d are configured based on the configuration information stored in the memory units 1a and 1b and execute prescribed operations.

The memory switching unit 2 switches the memory units 1a and 1b to store therein the configuration information on the stages of the pipeline process 5 to be performed by the processing elements 4a to 4d, in order from the first stage. In this connection, the operations OP1 and OP2 are executed at the first stage of the pipeline process 5, the operations OP3 and OP4 are executed at the second stage. At the third to fifth stages, the operations OP5 to OP7 are executed, respectively. In addition, data is sequentially input to the operations OP1 and OP2. Configuration information causing the processing elements 4a to 4d to execute the operations OP1 to OP7 is referred to as OPC1 to OPC7.

The configuration information output unit 3 switches the memory units 1a and 1b to output therefrom configuration information to the plurality of processing elements 4a to 4d.

The operations in FIG. 1 will be now described. The memory switching unit 2 first stores configuration information OPC1 and OPC2 on the first stage of the pipeline process 5 in the memory unit 1a, and then stores configuration information OPC3 to OPC7 on the subsequent stages, alternately in the memory units 1a and 1b. In addition, the configuration information output unit 3 outputs the configuration information from the memory unit 1a to the processing elements 4a to 4d and then outputs the configuration information, alternately from the memory units 1a and 1b.

First the memory switching unit 2 stores the configuration information OPC1 and OPC2 on the operations OP1 and OP2 of the first stage of the pipeline process 5 in the memory unit 1a. The configuration information output unit 3 outputs the configuration information OPC1 and OPC2 from the memory unit 1a to the processing elements 4a and 4b. The processing elements 4a and 4b are configured as a circuit based on the configuration information OPC1 and OPC2. Then data is inputted to the operations OP1 and OP2 and is processed.

Then, the memory switching unit 2 stores the configuration information OPC3 and OPC4 on the operations OP3 and OP4 of the second stage of the pipeline process 5, in the memory unit 1b. The configuration information output unit 3 outputs the configuration information OPC3 and OPC4 from the memory unit 1b to the processing element 4a and processing element 4b. The processing element 4a and processing element 4b are configured as a circuit based on the configuration information OPC3 and OPC4. Thereby the operations OP3 and OP4 are executed.

As shown in the pipeline process 5, the operations OP3 and OP4 receive data from the operations OP1 and OP2. Therefore, the configuration information OPC3 shows such a connection relation that the processing element 4a receives own data (data resulted from the preceding operation OP1) and also receives data (data resulted from the preceding operation OP2) from the processing element 4b. Similarly, the configuration information OPC4 shows such a connection relation that the processing element 4b receives own data (data resulted from the preceding operation OP2) and also receives data (data resulted from the preceding operation OP1) from the processing element 4a.

Then, the memory switching unit 2 stores the configuration information OPC5 on the operation OP5 of the third stage of the pipeline process 5, in the memory unit 1a. The configuration information output unit 3 outputs the configuration information OPC1, OPC2 and OPC5 from the memory unit 1a to the processing elements 4a to 4c. The processing elements 4a to 4c are configured as a circuit based on the configuration information OPC1, OPC2 and OPC5. Thereby the operation OP5 is executed. In addition, the processing elements 4a and 4b are configured for the operations OP1 and OP2, so that next data can be inputted to the operations OP1 and OP2.

Then, the memory switching unit 2 stores the configuration information OPC6 on the operation OP6 of the fourth stage of the pipeline process 5, in the memory unit 1b. The configuration information output unit 3 outputs the configuration information OPC3, OPC4 and OPC6 from the memory unit 1b to the processing elements 4a to 4c. The processing elements 4a to 4c are configured as a circuit based on the configuration information OPC3, OPC4 and OPC6. Thereby the operation OP6 is executed. In addition, the processing elements 4a and 4b are configured for the operations OP3 and OP4, so that data resulted from the preceding operations OP1 and OP2 can be processed by the operations OP3 and OP4.

Then, the memory switching unit 2 stores the configuration information OPC7 on the operation OP7 of the fifth stage of the pipeline process 5, in the memory unit 1a. The configuration information output unit 3 outputs the configuration information OPC1, OPC2, OPC5 and OPC7 from the memory unit 1a to the processing elements 4a to 4d. The processing elements 4a to 4d are configured as a circuit based on the configuration information OPC1, OPC2, OPC5 and OPC7. Thereby the operation OP7 is executed. In addition, the processing elements 4a to 4c are configured for the operations OP1, OP2 and OP5, so that next data can be inputted to the operations OP1 and OP2 and data resulted from the preceding operations OP3 and OP4 can be processed by the operation OP5. By repeating the above procedure, the pipeline process 5 can be performed.

As described above, a plurality of memory units 1a and 1b are prepared to alternately store configuration information on the stages of the pipeline process 5. Then the configuration information is output, alternately from the plurality of memory units 1a and 1b, to the plurality of processing elements 4a to 4d. This allows all stages of the pipeline process 5 to be virtually assigned to the processing elements 4a to 4d, resulting in enhancing efficiency of implementing the pipeline process in the processing elements and improving processing performance.

Next, the first embodiment of this invention will be described in detail with reference to the accompanying drawings.

Figure 2:
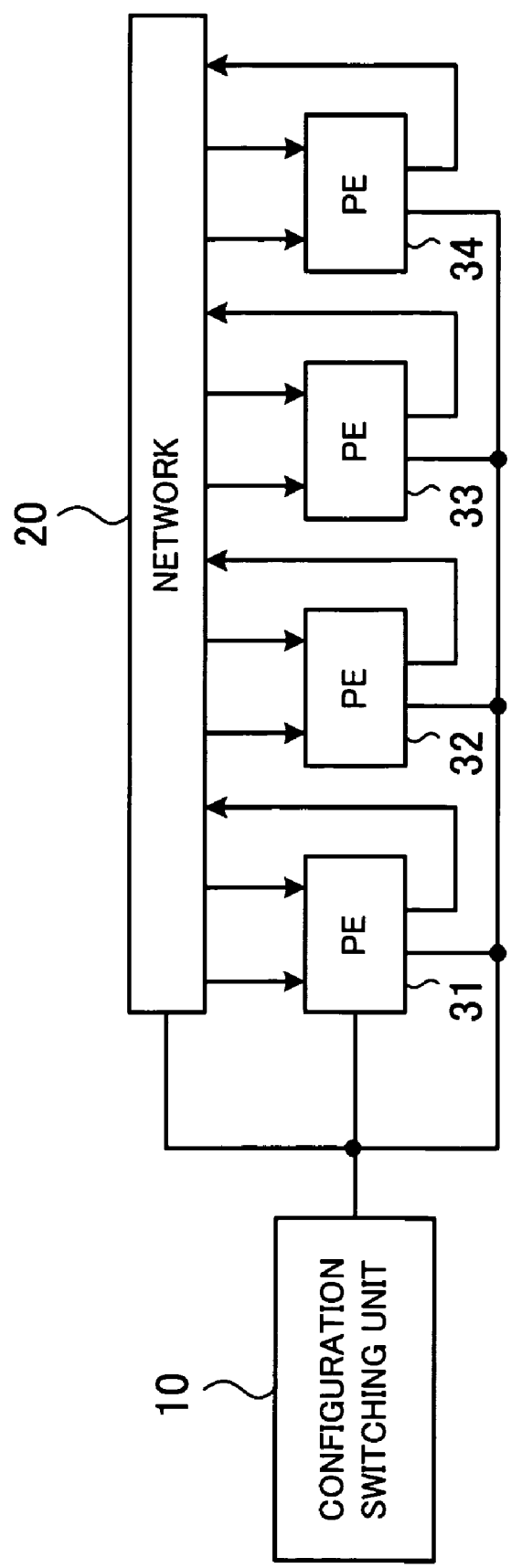
FIG. 2 is a circuit block diagram of a reconfigurable circuit according to the first embodiment.

FIG. 2 is a circuit block diagram of a reconfigurable circuit according to the first embodiment.

As shown in this figure, the reconfigurable circuit has a configuration switching unit 10, a network 20 and processing elements 31 to 34.

The configuration switching unit 10 has a plurality of memories. The configuration switching unit 10 performs a process, described later, on the basis of configuration data, to thereby store the configuration data, alternately in the plurality of memories. The plurality of memories are alternatively switched every cycle, and the configuration data stored in the selected memory is applied to the processing elements 31 to 34.

Each of the processing elements 31 to 34 has a plurality of ALUs, multipliers and adders, for example. The ALUs, multipliers, and adders of the processing elements 31 to 34 are configured based on configuration data so that each executes a single operation of a pipeline process.

The network 20 connects the processing elements 31 to 34 based on configuration data so that the processing elements 31 to 34 can execute a prescribed pipeline process.

The configuration switching unit 10 and the network 20 will be described in detail. First the configuration switching unit 10 will be described in detail.

Figure 3:
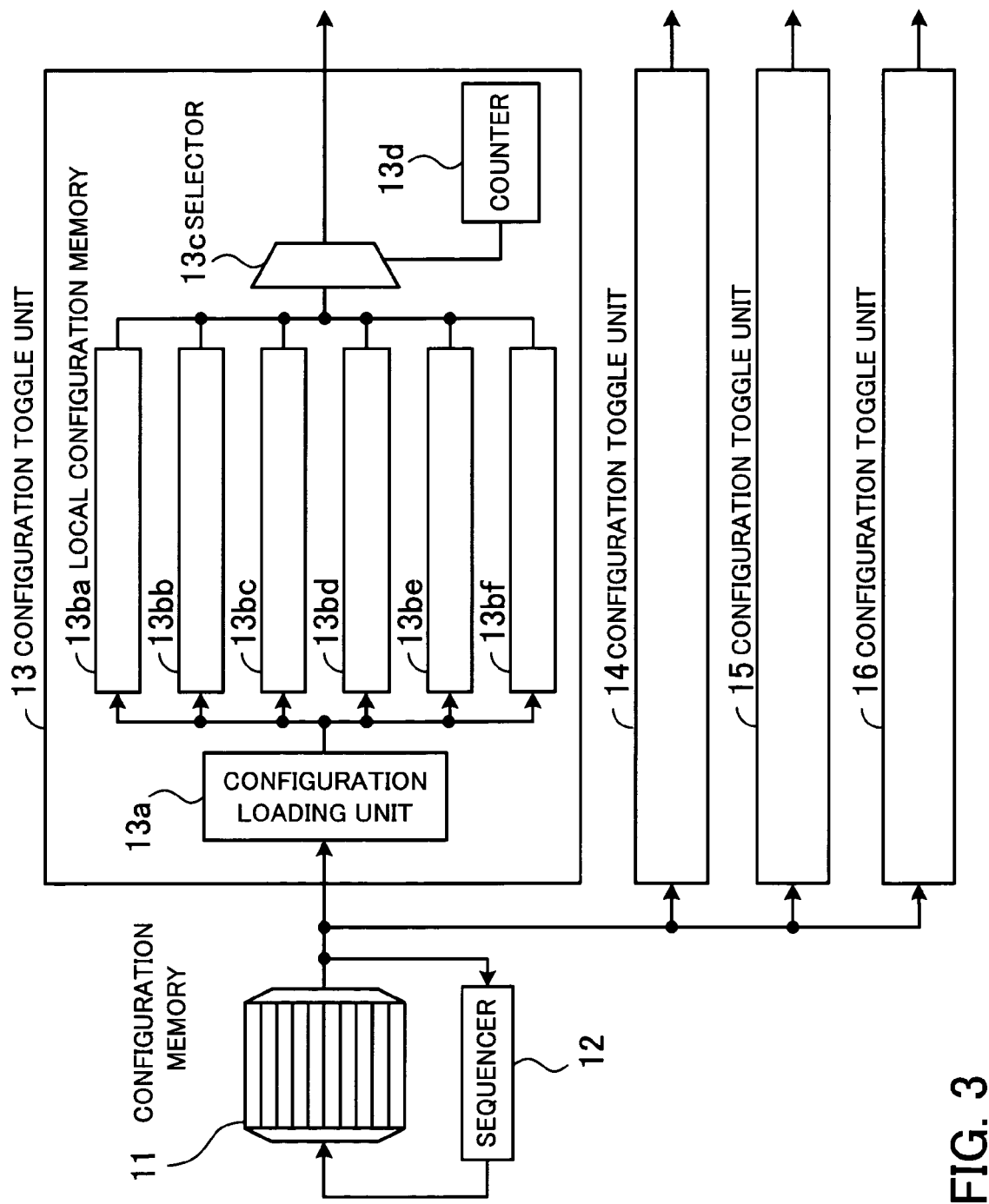
FIG. 3 is a circuit block diagram of a configuration switching unit.

FIG. 3 is a circuit block diagram of the configuration switching unit.

As shown in this figure, the configuration switching unit 10 has a configuration memory 11, a sequencer 12, and configuration toggle units 13 to 16.

The configuration memory 11 stores configuration data specifying the configuration of the processing elements 31 to 34 and a connection relation in the network 20.

The sequencer 12 selects configuration data to be outputted next, based on configuration data currently outputted from the configuration memory 11, and outputs the data to the configuration toggle units 13 to 16. The sequencer 12 outputs different configuration data on a task basis.

The configuration toggle units 13 to 16 are provided to correspond to the processing elements 31 to 34. The configuration toggle units 13 to 16 output configuration data received from the configuration memory 11 to corresponding processing elements 31 to 34 and the network 20 based on a prescribed process.

The configuration toggle unit 13 has a configuration loading unit 13a, local configuration memories 13ba to 13bf, a selector 13c and a counter 13d. It should be noted that the configuration toggle units 14 to 16 has the same circuit configuration as the configuration toggle unit 13 and therefore the units will not be explained.

The configuration loading unit 13a performs a process, described later, based on configuration data received from the configuration memory 11, and stores the configuration data, alternately in the local configuration memories 13ba to 13bf.

The local configuration memories 13ba to 13bf store configuration data. The configuration data stored in the local configuration memories 13ba to 13bf is outputted to the processing element 31 via the selector 13c.

The selector 13c selects configuration data stored in the local configuration memories 13ba to 13bf according to a signal received from the counter 13d, and outputs the selected data to the processing element 31 and the network 20.

The counter 13d outputs a signal controlling the output of the selector 13c, to the selector 13c. The counter 13d outputs to the selector 13c such a signal that the data stored in the local configuration memories 13ba to 13bf storing the configuration data is outputted to the processing element 31.

For example, as to the local configuration memories 13ba to 13bd, it is assumed that configuration data is stored in order from the local configuration memory 13ba. The counter 13d outputs signals to the selector 13c while repeatedly counts one to four. The selector 13c outputs configuration data from the local configuration memory 13ba to 13bd corresponding to a counted number, one to four. Thereby the configuration data stored in the local configuration memories 13ba to 13bd storing the configuration data is outputted to the processing element 31.

The network 20 will be now described.

Figure 4:
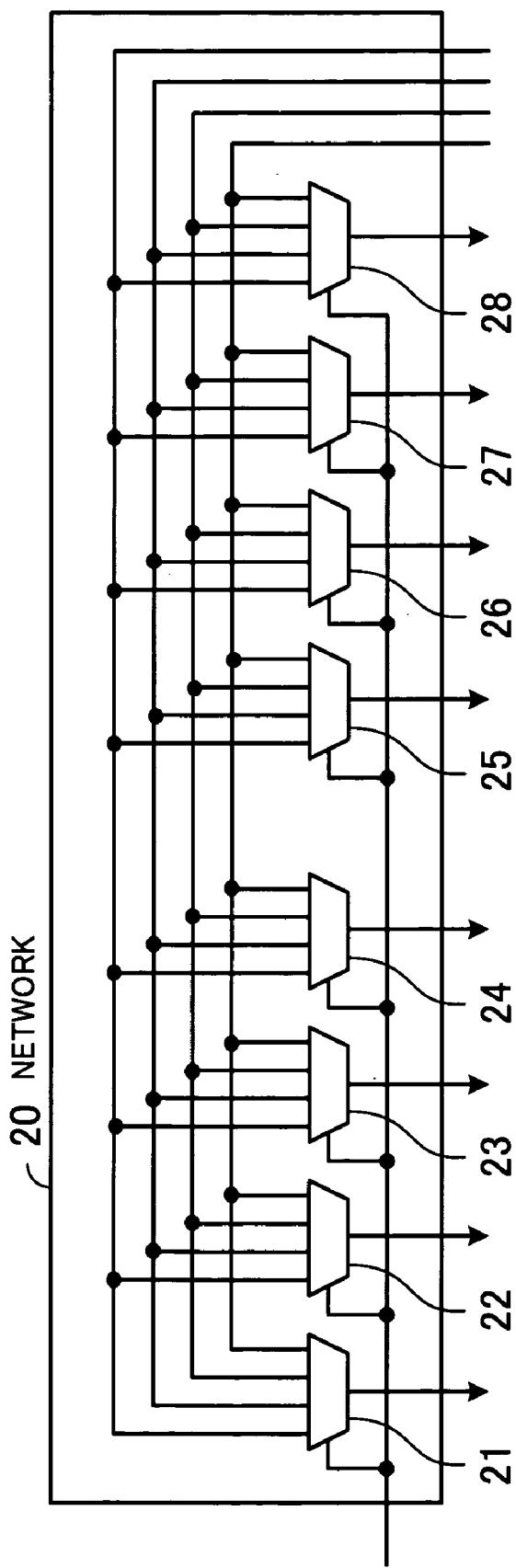
FIG. 4 is a circuit block diagram of a network.

FIG. 4 is a circuit block diagram of the network.

As shown in this figure, the network 20 has selectors 21 to 28. The inputs of the selectors 21 to 28 each is connected with four signal lines extending to the processing elements 31 to 34. In addition, the outputs of the selectors 21 to 28 are connected to the processing elements 31 to 34. The selectors 21 to 28 are connected to the configuration toggle units 13 to 14 and are designed to control output of an input signal based on configuration data. Thereby connection relations among the processing elements 31 to 34 can be determined.

Now, implementation of the pipeline process 112 of FIG. 13 in the reconfigurable circuit of FIG. 2 will be described. Each of the processing elements 31 to 34 of the reconfigurable circuit of FIG. 2 is designed to execute a single operation of the pipeline process 112.

Figure 5:
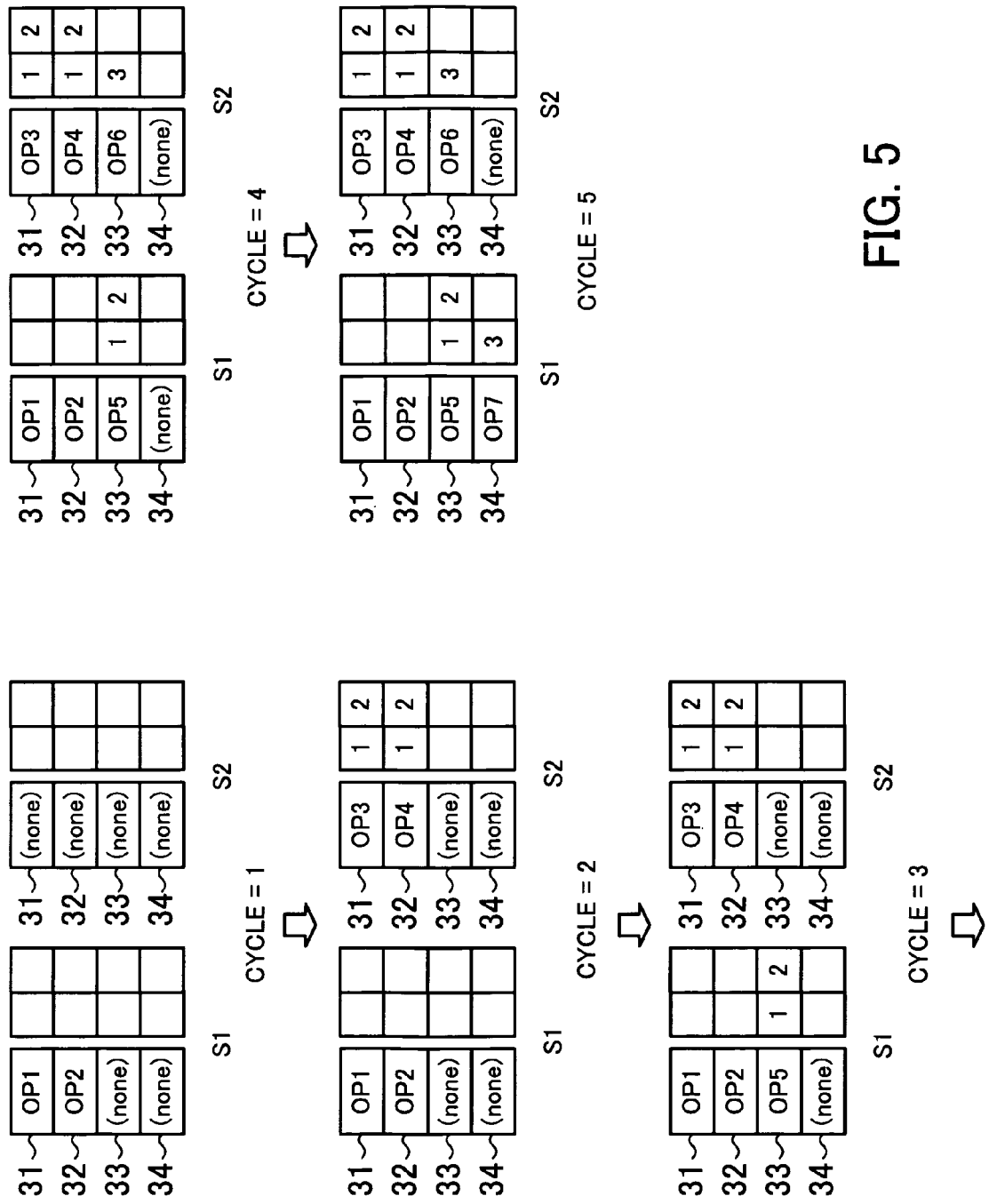
FIG. 5 is a view showing a flow of a pipeline process of FIG. 13 in the reconfigurable circuit of FIG. 2.
Figure 13:
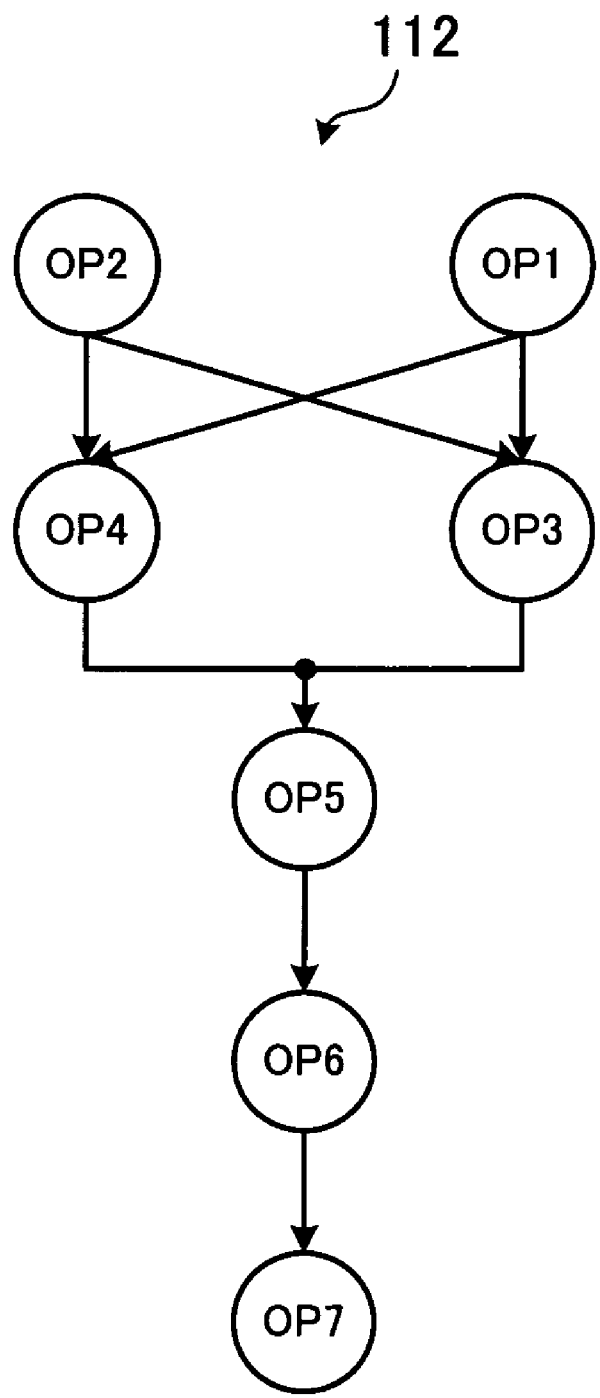
FIG. 13 is a view showing a pipeline process for a case of assigning a plurality of pipeline stages to processing elements.
Figure 14:
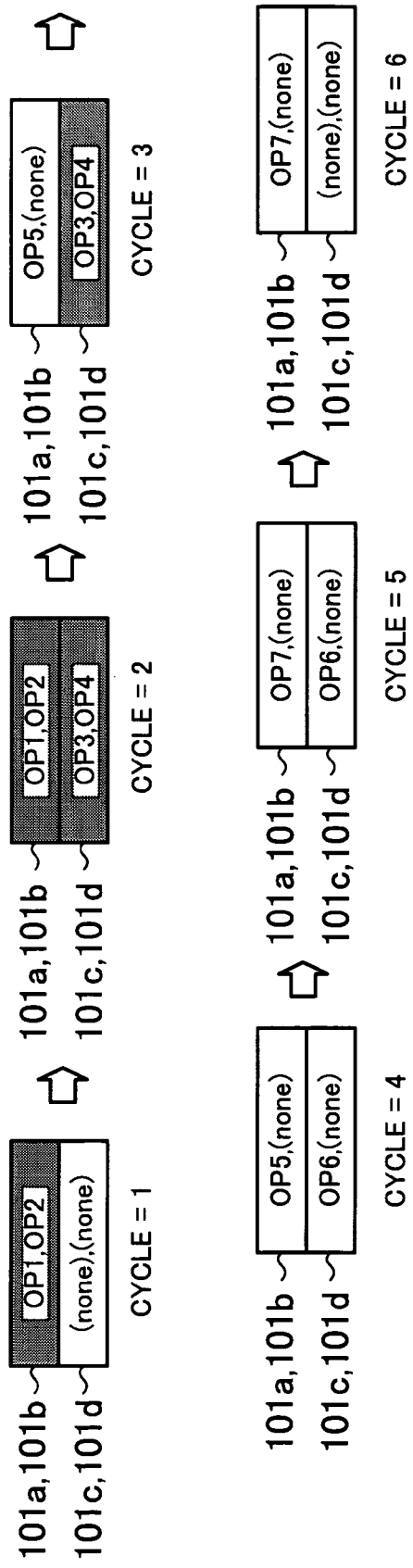
FIG. 14 is a view showing a flow of the pipeline process of FIG. 13 in the reconfigurable circuit of FIG. 10.

FIG. 5 shows a flow of the pipeline process of FIG. 13 in the reconfigurable circuit of FIG. 2.

Illustrated larger squares represent the processing elements 31 to 34 of FIG. 2. In addition, the insides of the squares show the operations OP1 to OP7 assigned to the processing elements 31 to 34. None represents such a situation that no operation is assigned.

Numerals of smaller squares indicate connection relations among the processing elements 31 to 34 of FIG. 2. The numerals 1 to 4 indicate connections to the processing elements 31 to 34, respectively. For example, in S2 of cycle 2, numerals 1 and 2 of the processing element 31 with the OP3 assigned thereto represent that the processing element 31 is connected to the processing element 31 (own processing element) and the processing element 32.

This figure shows a flow of the pipeline process 112 from cycle 1 to cycle 5. Configuration sides S1 and S2 of each cycle correspond to the local configuration memories of the configuration toggle units 13 to 16 shown in FIG. 3. Specifically, the configuration side S1 corresponds to the local configuration memory 13ba and local configuration memories of the configuration toggle units 14 to 16 which correspond to the local configuration memory 13ba. The configuration side S2 corresponds to the local configuration memory 13bb and local configuration memories of the configuration toggle units 14 to 16 which correspond to the local configuration memory 13bb.

The configuration sides S1 and S2, or the local configuration memories are switched every cycle, and connections to the processing elements 31 to 34 specified by connection relations (numerals in smaller squares) shown in the configuration sides S1 and S2 are realized. It is assumed that the configuration side S1 is effective in cycle 1 while the configuration side S2 is effective in cycle 2. After that, the configuration sides S1 and S2 are switched. The number of sides is determined according to the number of stages of the pipeline process 112 and the number of processing elements, and two or more sides are possible. The number of sides is determined with a method described in detail later. Two configuration sides S1 and S2 are sufficient for the pipeline process 112 of FIG. 13. The operations OP1 to OP7 of the stages of the pipeline process 112 are assigned to the processing elements 31 to 34 of the alternate configuration sides S1 and S2 in order from the first stage.

As shown in this figure, in cycle 1, the configuration side S1 is effective and the operations OP1 and OP2 of the first stage of the pipeline process 112 are assigned to the processing elements 31 and 32, respectively. Data is input to the operations OP1 and OP2 and is processed.

In cycle 2, the configuration side S2 is effective and the operations OP3 and OP4 of the second stage of the pipeline process 112 of FIG. 13 are assigned to the processing elements 31 and 32, respectively. In this connection, as indicated in the small squares, based on configuration data, the processing element 31 is connected to the own processing element and the processing element 32 and the processing element 32 is connected to the processing element 31 and the own processing element. Thereby, data resulted from the operations OP1 and OP2 executed in cycle 1 is inputted to the operation OP3. Similarly, data resulted from the operations OP1 and OP2 executed in cycle 1 is inputted to the operation OP4. Now, the second stage of the pipeline process 112 of FIG. 13 is completed.

In cycle 3, the configuration side S1 is effective and the operation OP5 is assigned to the processing element 33. In this connection, as indicated in the small squares, based on configuration data, the processing element 33 is connected to the processing elements 31 and 32. Thereby, data resulted from the operations OP3 and OP4 executed in cycle 2 is inputted to the operation OP5. On the other hand, next data is inputted to the operations OP1 and OP2 assigned to the processing elements 31 and 32.

In cycle 4, the configuration side S2 is effective and the operation OP6 is assigned to the processing element 33. In this connection, as indicated in the small squares, based on configuration data, the processing element 33 is connected to the processing element 33. Thereby, data resulted from the operation OP5 executed in cycle 3 is inputted to the operation OP6.

In cycle 5, the configuration side S1 is effective and the operation OP7 is assigned to the processing element 34. In this connection, as indicated in the small squares, based on configuration data, the processing element 34 is connected to the processing element 33. Thereby, data resulted from the operation OP6 executed in cycle 4 is inputted to the operation OP7. On the other hand, in cycle 5, next data is inputted to the operations OP1 and OP2 assigned to the processing elements 31 and 32.

As described above, the configuration sides S1 and S2 are prepared for the processing elements 31 to 34. Then the operations of the stages of the pipeline process 112 are assigned alternately to the configuration sides S1 and S2 (in actual, configuration data on the operations of the stages of the pipeline process 112 is stored alternately to the configuration sides S1 and S2). Then the configuration data is outputted, alternately from the configuration sides S1 and S2, to the processing elements 31 to 35 to thereby perform the pipeline process 112.

Figure 6:
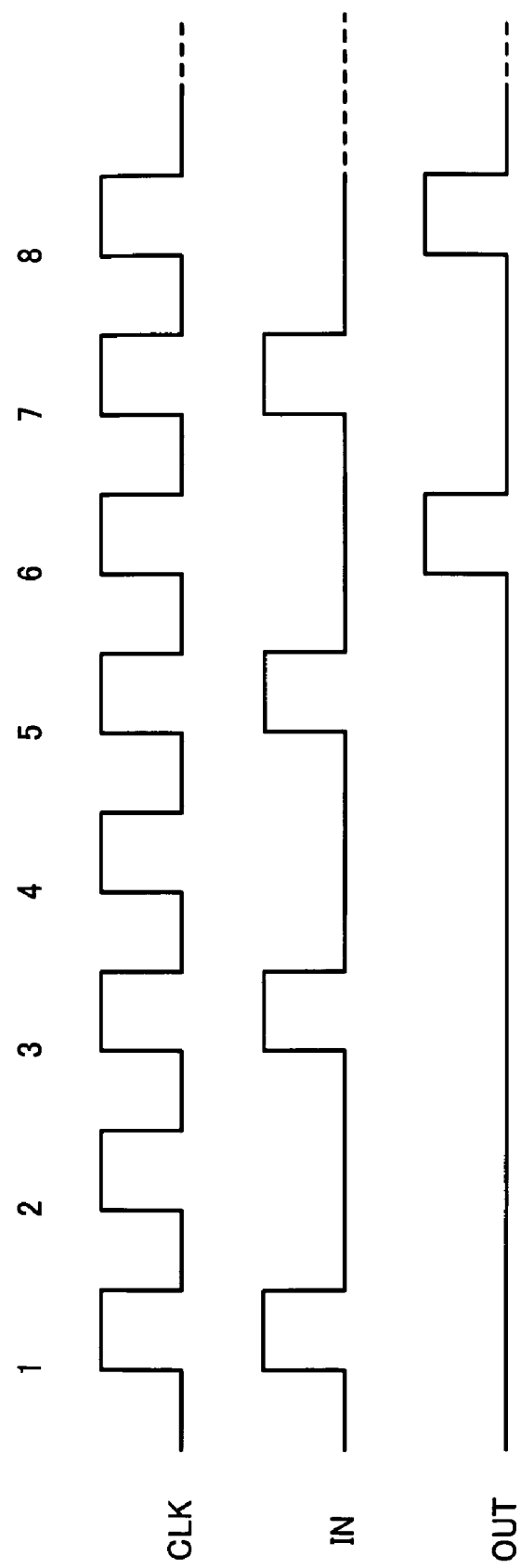
FIG. 6 is a timing chart of input/output timing of data in the pipeline process of FIG. 13 in the reconfigurable circuit of FIG. 2.

FIG. 6 is a timing chart of input/output of data in the pipeline process of FIG. 13 in the reconfiguration circuit of FIG. 2.

CLK of this figure indicates timing of executing operations. IN indicates input timing of data to the operations OP1 and OP2. OUT indicates output timing of data from the operation OP7.

As shown in this figure, at CLK 1 (CLK correspond to cycle shown in FIG. 5), data is inputted to the operations OP1 and OP2. At CLK 3, next data is inputted to the operations OP1 and OP2. Subsequent data is inputted every other CLKs 5, 7, . . . thereafter.

Data inputted at CLK 1 is processed by the operation OP7 at CLK 5, as explained with reference to FIG. 5. Therefore, the data inputted at CLK 1 is outputted at CLK 6. Data inputted at CLK 3 is processed by the operation OP7 at CLK 7. Therefore, the data inputted at CLK 3 is outputted at CLK 8.

Figure 15:
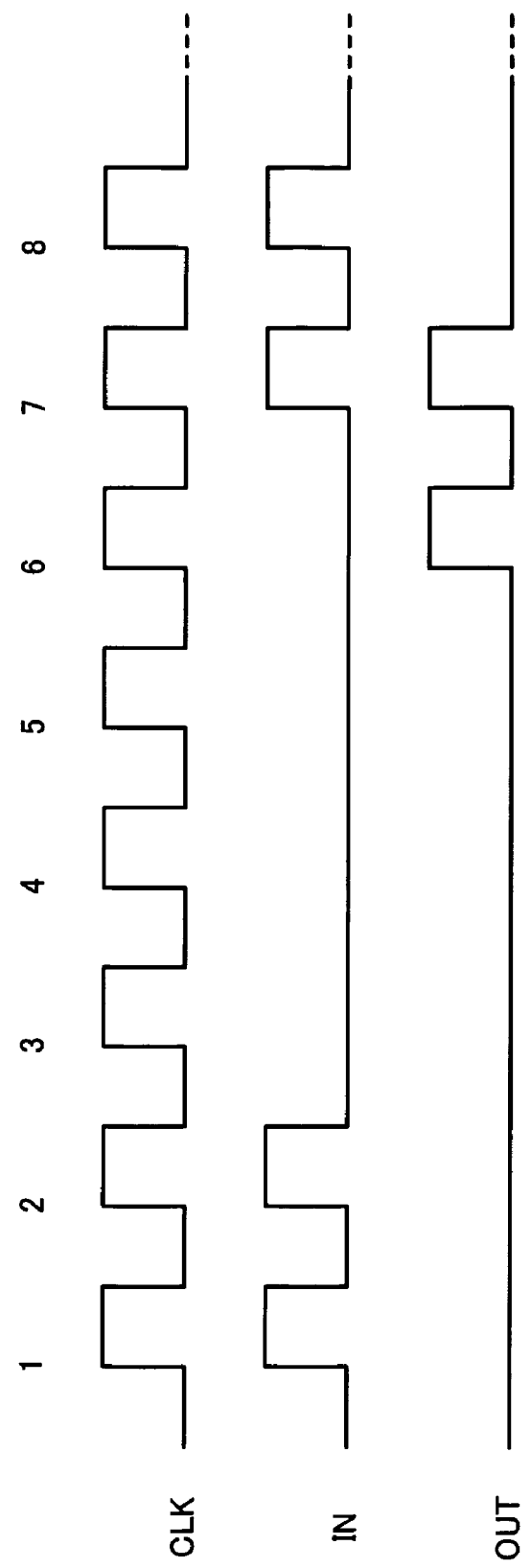
FIG. 15 is a timing chart of input/output timing of data in the pipeline process of FIG. 13

Referring to the timing chart of FIG. 15, data is inputted twice every six CLKs in the conventional reconfigurable circuit. In other words, data is inputted once every three CLKs while the pipeline process 112 of FIG. 13 is executed. On the other hand, referring to the timing chart of FIG. 6, in the reconfigurable circuit of FIG. 2, data is inputted once every other CLKs while the pipeline process 112 of FIG. 13 is executed. This allows the reconfigurable circuit of FIG. 2 to operate at a processing speed 1.5 times faster than the conventional one. This is because, although operations are assigned to processing elements while being overwritten in the conventional reconfigurable circuit, a plurality of configuration sides are prepared to assign all operations to the processing elements in the reconfigurable circuit of FIG. 2, so that an operation capable of receiving data exists and the data can be inputted at shorter intervals.

Next explanation is about how to determine the number of configuration sides and how to assign operations to processing elements.

FIG. 7 is a view explaining operation of the configuration loading unit of FIG. 3.

The configuration loading unit 13a of FIG. 3 first determines the number of configuration sides required for a target pipeline process. The configuration loading unit 13a performs division of Nop/Npe based on configuration data received from the configuration memory 11. Nop indicates the number of operations in the pipeline process and Npe indicates the number of processing elements. Lower ( ) means that a result of division is taken as the number of configuration sides if Nop is dividable by Npe while the least integer over the result of division is taken as the number of configuration sides if Nop is not dividable by Npe.

By using the number of configuration sides determined as described above, all operations of the pipeline process can be virtually assigned to the processing elements fewer than the number of operations. That is, the number of operations of the pipeline process 112 of FIG. 13 is seven. The number of processing elements of the reconfigurable circuit of FIG. 2 is four. To implement the seven operations in the four processing elements, it is recognized from Lower(7/4)=2 that two configuration sides are necessary. The two configuration sides virtually provide eight processing elements, so that the seven operations of the pipeline process 112 of FIG. 13 can be assigned.

Then, the configuration loading unit 13a repeats a following process until I becomes the number of pipeline stages starting with I=1.

The configuration loading unit 13a previously loads a configuration side produced through a following procedure, from the configuration memory 11 and sets it to the local configuration memory 13ba. A method of producing each configuration side is as follows.

First, it is determined whether the number of operations at the I-th pipeline stage is more than the number of unassigned processing elements of a configuration side Si (Si varies depending on I).

If the number of operations at the I-th pipeline stage is fewer than the number of unassigned processing elements of the configuration side Si, the operations at the I-th pipeline stage are assigned to unassigned processing elements on the configuration side Si which are capable of receiving output signals of processing elements to which operations are assigned at a preceding stage (in previous cycle). This process is repeated by incrementing I by one. In a case where the operations at the I-th pipeline stage cannot be assigned to the unassigned processing elements, the configuration loading unit 13a then determines whether the number of configuration sides calculated for the first time K is fewer than the preset maximum number of configuration sides M (M≧K=Lower(Nop/Npe)). If the first-calculated number of configuration sides K is fewer than the preset maximum number of configuration sides M, the number of configuration sides K is increased by one and then the above process is repeatedly performed starting with I=1. If the first-calculated number of configuration sides K is the preset maximum number of configuration sides M or greater, this process is completed by recognizing that the operations cannot be implemented in the processing elements.

In a case where the determination on whether the number of operations at the I-th pipeline stage is more than the number of unassigned processing elements on the configuration sides Si results that the number of operations at the I-th pipeline stage is the number of unassigned processing elements on the configuration sides Si or greater, the operations cannot be implemented in the processing elements on the configuration sides Si. In this case, it is determined whether the number of configuration sides calculated for the first time K is fewer than the preset maximum number of configuration sides M. If the first-calculated number of configuration sides K is fewer than the preset maximum number of configuration sides M, the number of configuration sides K is increased by one and the above process is repeatedly performed starting with I=1. If the first-calculated number of configuration sides K is the preset maximum number of configuration sides M or greater, this process is completed by recognizing that the operations cannot be implemented in the processing elements.

The configuration loading unit 13a loads thus determined configuration sides from the configuration memory 11 and assigns the operations of the pipeline process to the processing elements. Since the number of configuration sides varies depending on a pipeline process, a plurality of local configuration memories 13ba to 13bf are prepared to treat various pipeline processes.

As described above, a plurality of configuration sides are prepared and the operations of the stages of the pipeline process are assigned alternately to the plurality of configuration sides. Thereby all stages of the pipeline process can be virtually assigned to the processing elements, resulting in enhancing efficiency of implementing the pipeline process in the processing elements and improving processing performance.

In addition, a plurality of local configuration memories 13ba to 13bf are prepared, so as to treat pipeline processes of various kinds of applications.

The second embodiment of this invention will be now described in detail with reference to the accompanying drawings.

In the second embodiment, in a case where operations of a pipeline process cannot be assigned in processing elements on a configuration side, the operations are implemented in a configuration side having free processing elements and then the pipeline process is performed, without increasing the number of configuration sides. The circuit configuration of the reconfigurable circuit according to the second embodiment is identical to that according to the first embodiment, except that the reconfigurable circuit according to the second embodiment has a memory device, for example, a flip-flop for temporarily saving data processed by operations. Therefore, the circuit configuration of the reconfigurable circuit will not be described.

Figure 8:
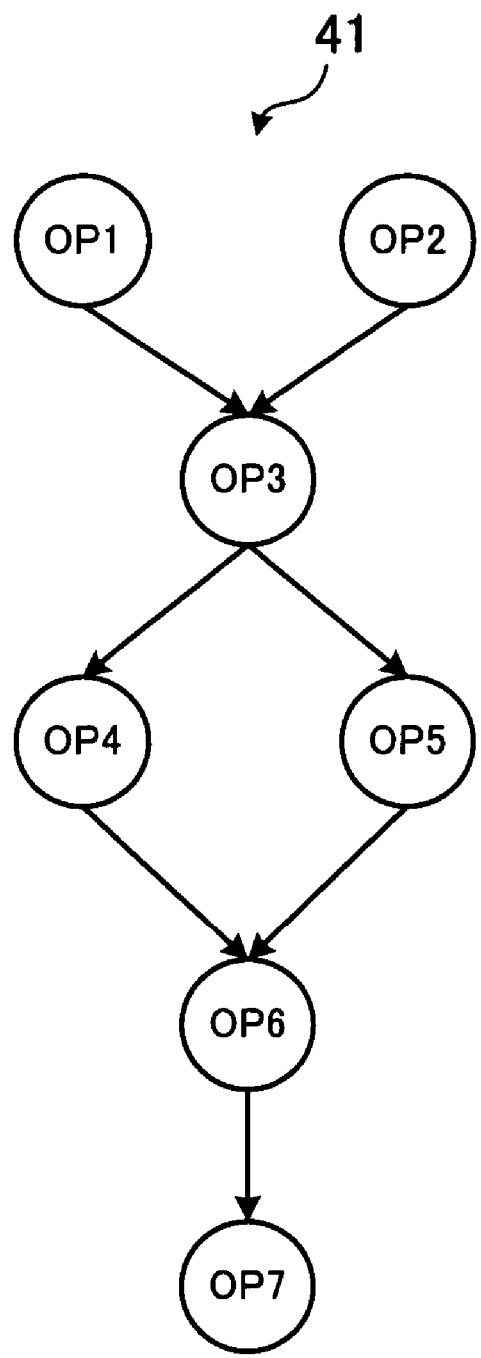
FIG. 8 is a view showing a pipeline process to be used for explaining the second embodiment.

FIG. 8 is a view showing a pipeline process for explaining the second embodiment.

In the illustrated pipeline process 41, operations OP1 and OP2 are executed at the first stage, an operation OP3 is executed at the second stage, and operations OP4 and OP5 are executed at the third stage. Then, operations OP6 and OP7 are executed in order. Arrows in this figure represent a data flow. To the operations OP1 and OP2, data to be processed is sequentially inputted. Implementation of this pipeline process 41 in the reconfigurable circuit of FIG. 2 having a flip-flop that temporarily saves data will be described.

Figure 9:
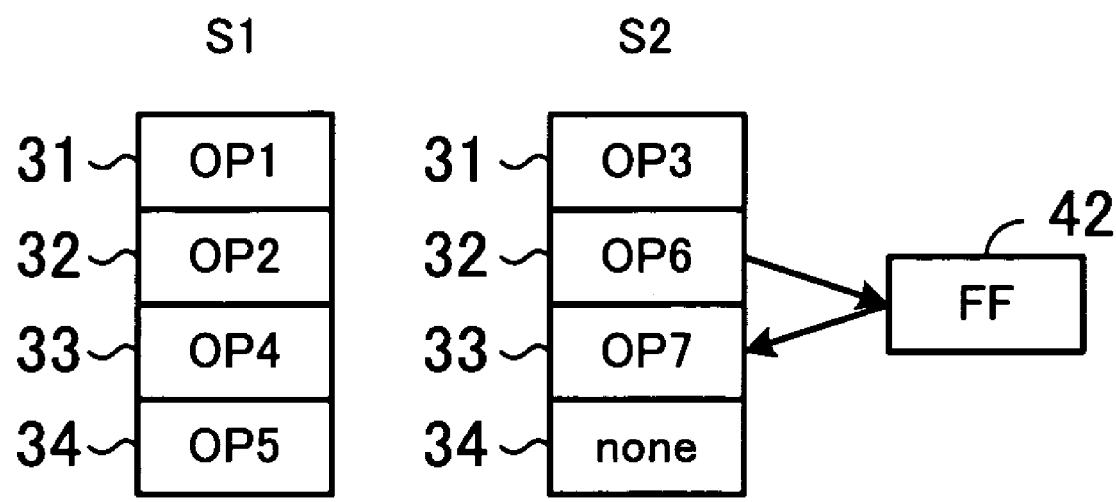
FIG. 9 is a view showing a flow of the pipeline process of FIG. 8 in the reconfigurable circuit having a flip-flop.
Figure 10:
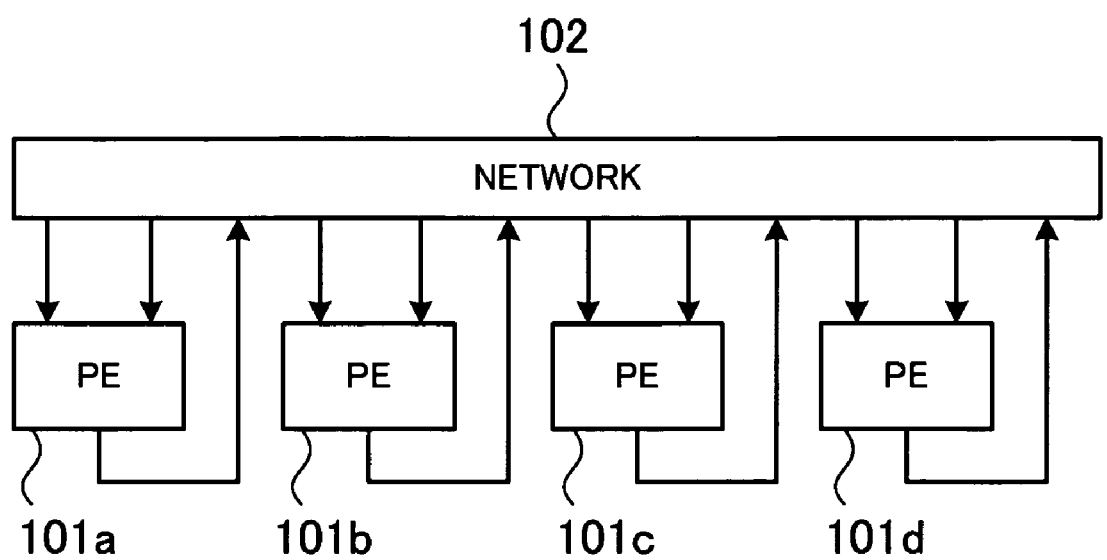
FIG. 10 is a circuit block diagram of a conventional reconfigurable circuit.
Figure 11:
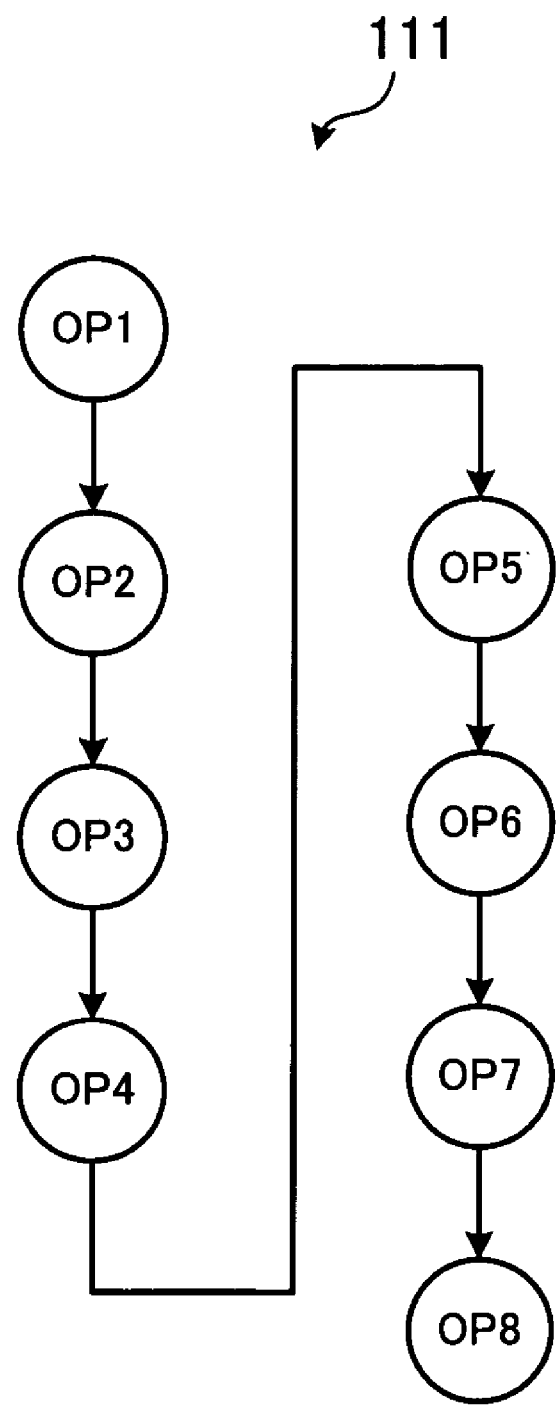
FIG. 11 is a view showing a pipeline process.
Figure 12:
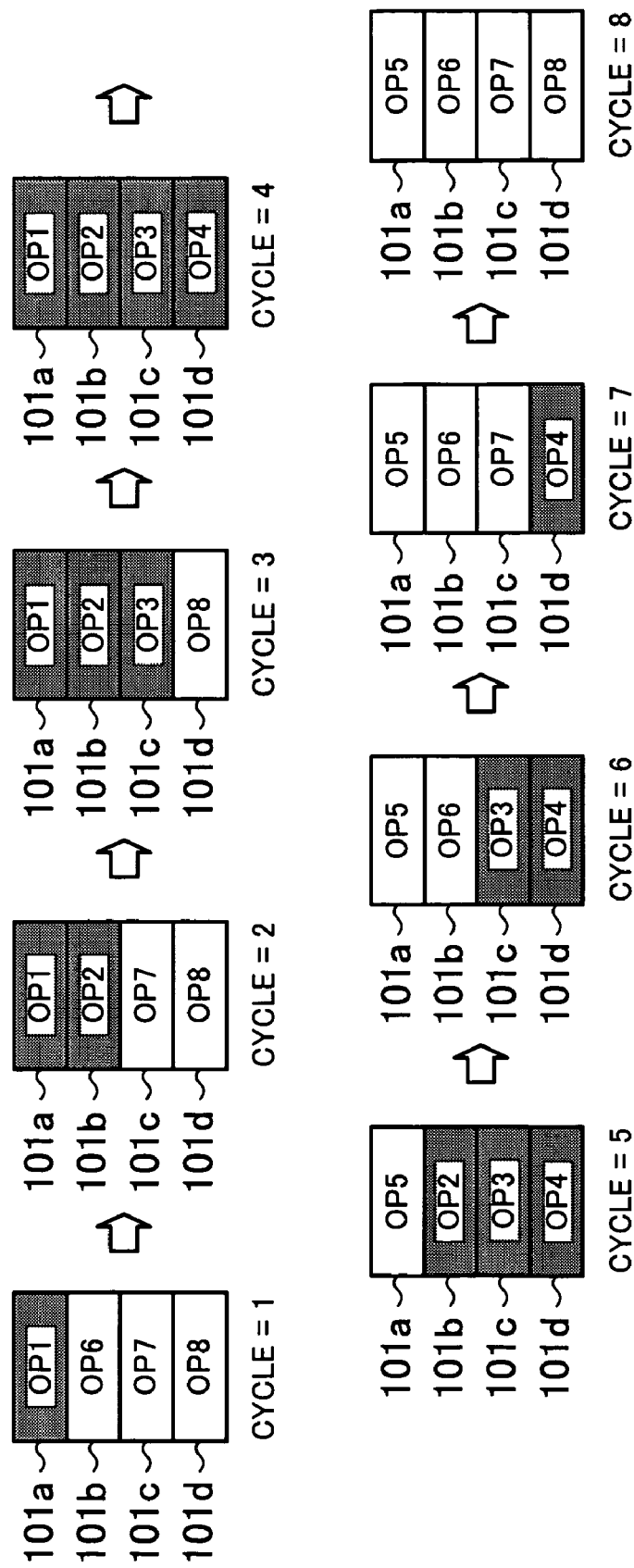
FIG. 12 is a view showing a flow of the pipeline process of FIG. 11 in the reconfigurable circuit of FIG. 10.

FIG. 9 is a view showing a flow of the pipeline process of FIG. 8 in the reconfigurable circuit having the flip-flop.

Illustrated squares represent the processing elements 31 to 34 of the reconfigurable circuit of FIG. 2 having the flip-flop. In addition, the insides of the squares show operations assigned to the processing elements 31 to 34.

S1 and S2 in this figure indicate configuration sides. In addition, a FF 42 indicates the flip-flop of the reconfigurable circuit of FIG. 2. The operations OP1 to OP7 of the pipeline process 41 of FIG. 8 are assigned to the processing elements 31 to 34 of the alternate configuration sides S1 and S2 every cycle.

In cycle 1, the operations OP1 and OP2 are assigned to the processing elements 31 and 32 of the configuration side S1.

In cycle 2, the operation OP3 is assigned to the processing element 31 of the configuration side S2.

In cycle 3, the operations OP4 and OP5 are assigned to the processing elements 33 and 34 of the configuration side S1.

In cycle 4, the operation OP6 is assigned to the processing element 32 of the configuration side S2.

In cycle 5, the operation OP7 should be assigned to a processing element of the configuration side S1, but there is no free processing element. On the other hand, no operation has been assigned to the processing elements 33 and 34 of the configuration side S2, which means that there are free processing elements and the operation OP7 can be assigned to the processing element 33. Therefore, in cycle 5, data processed by the operation OP6 is temporarily saved in the FF 42.

In cycle 6, the operation OP7 is assigned to the processing element 33 of the configuration side S2. At this time, it is designed so that the data stored in the FF 42 is taken in the processing element 33.

As described above, even in a case where operations of a pipeline process cannot be implemented in processing elements of a configuration side, the pipeline process can be performed by preparing a memory device for storing data, without increasing the number of configuration sides.

In a case where a plurality of data is to be temporarily saved, a plurality of FFs are prepared so as to save/read data in/from the plurality of FFs in a FIFO manner.

In a reconfigurable circuit according to this invention, a plurality of memory units are prepared and configuration information on the stages of the pipeline process is stored alternately in the plurality of memory units. Then the configuration information is outputted, alternately from the plurality of memory units, to processing elements. Therefore, all stages of the pipeline process can be virtually assigned to the processing elements, resulting in enhancing efficiency of implementation of the pipeline process in the processing elements and improving processing performance.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A reconfigurable circuit having a plurality of processing elements, the reconfigurable circuit-comprising:
    a plurality of memory units each having a plurality of memory areas corresponding to respective ones of the plurality of processing elements to store configuration information for reconfiguring the plurality of processing elements;
    a memory switching unit to select one of the plurality of memory units to store in turn every clock cycle the configuration information in next available memory area for next stage of pipeline process to be performed by respective processing elements; and
    a configuration information output unit to output all the configuration information to processing elements from respective memory areas of one of the plurality of memory units selected by the memory switching unit in turn each clock cycle.

2. The reconfigurable circuit according to claim 1, wherein the plurality of memory units are configured to execute various pipeline processes.

3. The reconfigurable circuit according to claim 1, wherein the configuration information output unit outputs the configuration information in conjunction with the selections of the memory switching unit.

4. The reconfigurable circuit according to claim 1, wherein, when the configuration information is stored in the plurality of memory units, the number of the plurality of memory units for storing the configuration information is increased.

5. The reconfigurable circuit according to claim 1, wherein, when the configuration information is stored in the plurality of memory units, the memory switching unit selects the at least one memory unit from memory units having free space.

6. The reconfigurable circuit according to claim 1, further comprising:
    a memory device to temporarily save data outputted from the plurality of processing elements.

7. The reconfigurable circuit according to claim 1, wherein the configuration information output unit outputs first configuration information to at least one first processing element at a time different from when the configuration information output unit outputs second configuration information to at least one second processing element.

8. A control method for a reconfigurable circuit having a plurality of processing elements, the method comprising:
    selecting in turn one of a plurality of memory units that store configuration information for reconfiguring the plurality of processing elements, the plurality of memory units each having a plurality of memory areas corresponding to respective ones of the plurality of processing elements;
    storing in turn every clock cycle the configuration information in next available memory area of the selected memory unit for next stage of pipeline process to be performed by respective processing elements; and
    outputting all the configuration information to processing elements from respective memory areas of one of the plurality of memory units selected in turn each clock cycle.

9. The control method according to claim 8, wherein the outputting outputs first configuration information to at least one first processing element at a time different from when the configuration information output unit outputs second configuration information to at least one second processing element.

* * * * *